(12) United States Patent
Neal et al.

(10) Patent No.: US 9,816,571 B1
(45) Date of Patent: Nov. 14, 2017

(54) BI-DIRECTIONAL MAGNETIC CLUTCH

(71) Applicant: NORTHROP GRUMMAN SYSTEMS CORPORATION, Falls Church, VA (US)

(72) Inventors: Matthew A. Neal, Lancaster, CA (US); Charles R. Smith, Acton, CA (US); Robert E. Bauer, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/598,811

(22) Filed: May 18, 2017

(51) Int. Cl.
| | |
|---|---|
| *F16D 41/066* | (2006.01) |
| *F16D 41/08* | (2006.01) |
| *F16D 27/01* | (2006.01) |
| *F16D 43/14* | (2006.01) |
| *F16D 27/02* | (2006.01) |

(52) U.S. Cl.
CPC .......... *F16D 41/066* (2013.01); *F16D 27/02* (2013.01); *F16D 41/088* (2013.01); *F16D 43/14* (2013.01); *F16D 27/01* (2013.01)

(58) Field of Classification Search
USPC .................................................. 192/105 BB
See application file for complete search history.

(56) References Cited

U.S. PATENT DOCUMENTS

| | | | | | |
|---|---|---|---|---|---|
| 2,410,818 | A | * | 11/1946 | Grant, Jr. .............. | F16D 41/066 192/114 R |
| 3,653,154 | A | * | 4/1972 | Hayday .................. | E05F 15/63 192/45.017 |
| 5,211,258 | A | * | 5/1993 | Wibom .................. | B60K 20/00 180/275 |
| 5,862,903 | A | * | 1/1999 | Gruden .................. | E05B 81/25 192/105 BB |
| 6,046,522 | A | * | 4/2000 | Ko ........................ | H02K 7/1185 192/45.005 |

* cited by examiner

*Primary Examiner* — Mark A Manley
(74) *Attorney, Agent, or Firm* — John A. Miller; Miller IP Group, PLC

(57) ABSTRACT

A bi-directional coupler that selectively couples and decouples a driving element to a driven element. The coupler includes an outer shaft having an outer shaft slot and an inner shaft having an inner shaft slot, where the inner and outer shafts are configured to rotate independently of each other. The coupler also includes a ball bearing provided within the inner shaft slot and having a size so that when the ball bearing is located at a center portion of the inner shaft slot it does not interfere with rotation of the outer shaft, where the ball bearing is held in that location by a magnet located in the inner shaft. Rotation of the inner shaft above a predetermined rotational speed causes the ball bearing to engage the outer shaft slot so as to cause the inner shaft to be locked to the outer shaft and rotate therewith.

19 Claims, 1 Drawing Sheet

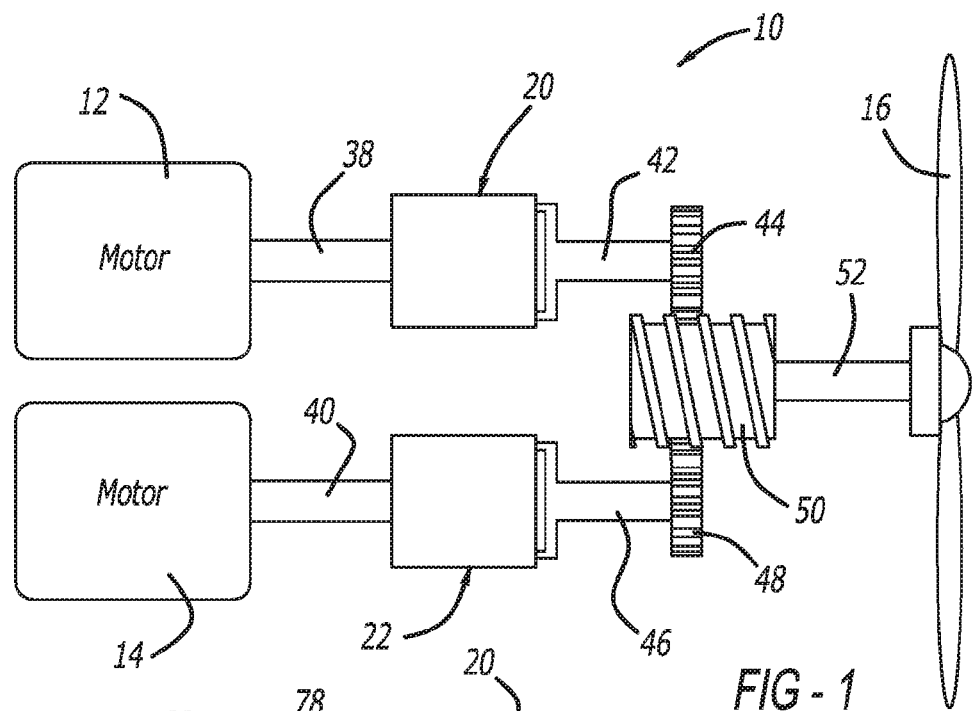
FIG-1
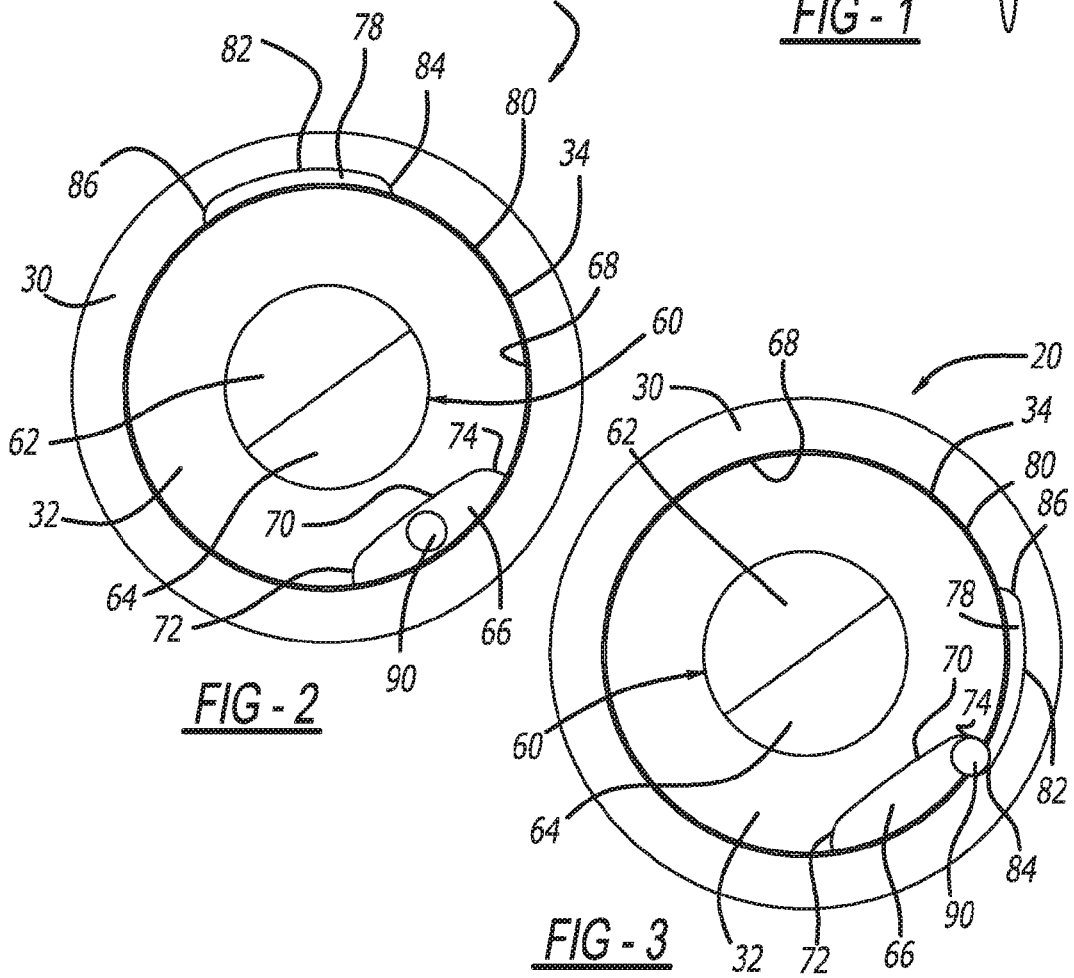
FIG-2
FIG-3

BI-DIRECTIONAL MAGNETIC CLUTCH

BACKGROUND

Field

This invention relates generally to a coupler that selectively couples a driving element to a driven element and, more particularly, to a bi-directional coupler that selectively couples an electric motor to a driven element, where the coupler includes a ball bearing provided in a specially configured slot and a magnet that operate to cause an inner shaft coupled to the motor to be selectively coupled to an outer shaft coupled to the driven element.

Discussion

Electric motors are often employed in various applications to drive various driven elements at various speeds. For some of these applications, it is desirable that if the motor fails or otherwise becomes ineffective, a backup or redundant motor can be coupled to the driven element, where the other motor is decoupled therefrom. Further, for some of these applications, it is desirable that the motor drives the driven element in both a clockwise and a counter-clockwise direction. Even further, it may be desirable in some of these applications that both motors simultaneously drive the driven element so as to double or otherwise increase the torque provided to the driven element.

Bi-directional coupling devices for decoupling one motor and coupling another motor, or coupling both motors, to a driven element are known in the art. However, the known bi-directional couplers that operate in this manner are typically quite bulky and difficult to miniaturize for those applications that require smaller and lighter couplers. Further, the known bi-directional couplers often require very high rotational speeds to operate, or rely on friction for operation, which may not be suitable for certain applications.

SUMMARY

The present invention discloses and describes a bi-directional coupler that couples a motor to a driven element so that the coupler can disengage the motor from the driven element to allow a second, redundant motor to be selectively coupled to the driven element. The bi-directional coupler includes an outer shaft having an inner perimeter surface and an outer shaft slot with a curved configuration recessed into the outer shaft from the inner perimeter surface to define an inner recessed portion and outer end portions located at the inner perimeter surface of the outer shaft. The bi-directional coupler also includes an inner shaft configured concentric with the outer shaft and including an outer perimeter surface, where the inner shaft includes an inner shaft slot having a curved configuration recessed into the inner shaft from the outer perimeter surface to define an inner recessed portion and outer end portions located at the outer parameter surface of the inner shaft, where the inner and outer shaft are configured to rotate independently of each other. The coupler also includes a ball bearing provided within the inner shaft slot and having a size so that when the ball bearing is located at the inner recessed portion of the inner shaft slot it does not interfere with rotation of the outer shaft, where the ball bearing is held in that location by a magnet located in the inner shaft. Rotation of the inner shaft above a predetermined rotational speed causes the ball bearing to move from the inner recessed portion under centripetal force to one of the end portions and engage one of the end portions of the outer shaft slot so as to cause the inner shaft to be locked to the outer shaft and rotate therewith.

Additional features of the present invention will become apparent from the following description and appended claims, taken in conjunction with the accompanying drawings.

BRIEF DESCRIPTION OF THE DRAWINGS

FIG. 1 is an illustration of a drive assembly including redundant electric motors each being coupled to a bi-directional coupler that drive a driven element;

FIG. 2 is an end view of one of the couplers separated from the drive assembly showing input and output shafts of the coupler being de-coupled; and FIG. 3 is an end view of the coupler shown in FIG. 2 and showing the input and output shafts being coupled together.

DETAILED DESCRIPTION OF THE EMBODIMENTS

The following discussion of the embodiments of the invention directed to a bi-directional coupler for coupling an electric motor to a driven element is merely exemplary in nature, and is in no way intended to limit the invention or its applications or uses. For example, as will be discussed below, the bi-directional coupler has particular application for coupling an electric motor to a driven element. However, the bi-directional coupler of the invention may have application for other uses including driving elements other than electric motors.

FIG. 1 is an illustration of a drive assembly 10 including a first motor 12 and a second motor 14 that are operable to separately or in combination drive a driven element 16, for example, a propeller, in both a clockwise and a counter-clockwise direction. The drive assembly 10 includes a first bi-directional coupler 20 coupled to the first motor 12 and a second bi-directional coupler 22 coupled to the second motor 14. It is noted that although the drive assembly 10 includes the electric motors 12 and 14 as the driving elements, those skilled in the art will appreciate that other types of driving elements will be applicable for the coupler of the invention, such as internal combustion engines, jet engines, etc.

FIG. 2 is an end view of the coupler 20 removed from the assembly 10, where the coupler 22 is identical. The coupler 20 includes an outer output shaft 30 and a concentric inner input shaft 32 separated by a gap 34, where the shafts 30 and 32 are configured to be able to rotate independently to each other. A motor shaft 38 is coupled to the inner shaft 32 at one end and is coupled to the motor 12 at an opposite end. Likewise, a motor shaft 40 is coupled to an inner shaft of the coupler 22 at one end and is coupled to the motor 14 at an opposite end. The outer shaft 30 of the coupler 20 is rigidly coupled to a drive shaft 42 having a gear 44 mounted to an end thereof opposite to the coupler 20. Likewise, the outer shaft of the coupler 22 is rigidly coupled to a drive shaft 46 having a gear 48 mounted to an end thereof opposite to the coupler 22. Both of the gears 44 and 48 engage a worm gear 50 so that when one or both of the drive shafts 42 and 46 rotate, the worm gear 50 rotates. The worm gear 50 is coupled to an element shaft 52 that is rigidly coupled to the driven element 16. Thus, when the worm gear 50 rotates, the driven element 16 also rotates.

As will be discussed in detail below, operation of either of the motors 12 and 14 causes the inner shaft of the associated coupler 20 or 22 to rotate, which causes the inner shaft to engage the outer shaft to drive one or both of the drive shafts 42 and 46, and thus drive the driven element 16. Further, the motors 12 and 14 can drive the motor shafts 38 and 40 in either the clockwise or counter-clockwise direction to cause the driven element 16 to rotate in either direction, but the motors 12 and 14 cannot be driven in opposite directions.

If the motor 12 is operating and the motor 14 is not operating, the motor shaft 38 will rotate and the motor shaft 40 will not rotate. Rotation of the shaft 30 causes the inner shaft 32 of the coupler 20 to engage the outer shaft 30, and thus turn the drive shaft 42 to cause the driven element 16 to rotate, as described. Rotation of the worm gear 50 as driven by the gear 44 causes the drive shaft 46 to rotate through the gear 48, which causes the outer shaft of the coupler 22 to rotate. However, since the motor 14 is not operating to rotate the motor shaft 40, the inner and outer shafts of the coupler 22 are not engaged and the outer shaft of the coupler 22 rotates independent of the inner shaft of the coupler 22.

Likewise, if the motor 14 is operating and the motor 12 is not operating, the motor shaft 40 will rotate and the motor shaft 38 will not rotate. Rotation of the shaft 40 causes the inner shaft of the coupler 22 to engage the outer shaft of the coupler 22, and thus turn the drive shaft 46 to rotate the driven element 16, as described. Again, rotation of the worm gear 50 causes the drive shaft 42 to rotate through the gear 44, which causes the outer shaft 30 of the coupler 20 to rotate. However, since the motor 12 is not operating to rotate the motor shaft 38, the inner shaft 32 and the outer shaft 30 of the coupler 20 are not engaged and the outer shaft 30 of the coupler 20 rotates independent of the inner shaft 32 of the coupler 22. Thus, if one of the motors 12 or 14 is being used to drive the driven element 16, and that motor fails, it can be turned off, and the other motor 12 or 14 can be turned on to drive the driven element 16. Further, both of the motors 12 and 14 can be driven in the same direction so that power from both of the motors 12 and 14 drives the driven element 16.

Returning to FIG. 2, it can be seen that the inner shaft 32 includes a center magnet 60 having a north pole 62 and a south pole 64. Further, the inner shaft 32 includes a general U-shaped slot 66 recessed into an outer edge 68 thereof, where the slot 66 includes a center portion 70 and ramped end portions 72 and 74 located where the slot 66 meets the outer edge 68 of the inner shaft 32. Likewise, the outer shaft 30 includes a general U-shaped slot 78 recessed into an inner edge 80 thereof, where the slot 78 includes a center portion 82 and ramped end portions 84 and 86 located where the slot 78 meets the inner edge 80 of the outer shaft 30. A ball bearing 90 is provided within the recessed slot 66 and is of a size so that it does not extend to the outer edge 68 of the shaft 32 when the ball bearing 90 is positioned in the center portion 70. The size of the ball bearing 90 and the size and depth of the slots 66 and 78 would depend on the particular coupler and its application. It is noted that in this non-limiting embodiment, the depth of the slot 78 is less than the depth of the slot 66 for reasons that will become apparent from the discussion below.

When the inner shaft 32 is not being rotated, or being rotated at a slow speed, by the motor shaft 38, the magnetic attraction between the ball bearing 90 and the magnet 60 causes the ball bearing 90 to be positioned closest to the magnet 60 in the center portion 70, as shown in FIG. 2. When the motor shaft 38 is being driven by the motor 12 at an increasing rotational speed, centripetal force on the ball bearing 90 causes it to ride up the slot 66 towards one of the end portions 72 or 74 depending on the direction that the shaft 32 is being rotated. Once the rotational speed of the shafts 38 and 32 reaches a certain critical speed, the ball bearing 90 reaches the end portion 72 or 74 where it will eventually encounter the end portion 84 or 86 in the slot 78 when the slots 66 and 78 are aligned, which causes the inner shaft 32 to engage and be locked to the outer shaft 30, and thus causes the outer shaft 30 to rotate at the speed of the motor shaft 38.

FIG. 3 shows this locking engagement between the inner shaft 32 and the outer shaft 30. It is noted that in FIG. 3, the inner shaft 32 is rotated by the motor shaft 38 in a clockwise direction so that the ball bearing 90 rides up the end portion 74 of the slot 66 and engages the end portion 84 of the slot 78. Thus, it can be seen that once the motor shaft 38 reaches a certain rotational speed, the coupler 20 causes the motor 12 to drive the driven element 16, where the coupler 22 for the non-driven motor shaft 40 allows the outer shaft for the coupler 22 to rotate freely. When the motor 12 fails or is turned off and the motor shaft 38 decelerates and stops, the magnetic attraction between magnet 60 and the ball bearing 90 causes the ball bearing 90 to return to the center portion 70, which disengages the inner shaft 32 from the outer 30, and stops the driven element 16 from being driven. The motor 14 can then be turned on to drive the driven element 16 in the manner described above. As mentioned, both motors 12 and 14 can be turned on to drive the driven element 16 at increased speed and torque.

It is noted that the couplers 20 and 22 as described cannot be back driven. Specifically, if the motors 12 and 14 are turned off and the driven element 16 is somehow rotated in either direction, the element 16 will rotate freely, but since the inner shaft and the outer shaft of the couplers 20 and 22 are de-coupled, torque will not be fed back into the motors 12 and 14.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A bi-directional coupler for coupling a driving element to a driven element, said coupler comprising:
   an outer shaft including an inner perimeter surface, said outer shaft further including an outer shaft slot having a curved configuration recessed into the outer shaft from the inner perimeter surface to define an inner recessed portion and outer end portions located at the inner perimeter surface of the outer shaft;
   an inner shaft configured concentric with the outer shaft and including an outer perimeter surface, said inner shaft further including an inner shaft slot elongated in a direction tangential to the outer perimeter surface and having a curved configuration recessed into the inner shaft from the outer perimeter surface to define an inner recessed portion and outer end portions located at the outer perimeter surface of the inner shaft, said inner and outer shafts being independently rotatable relative to each other; and
   a ball bearing provided within the inner shaft slot and having a size so that when the ball bearing is located at the inner recessed portion of the inner shaft slot it does not interfere with rotation of the outer shaft, wherein rotation of the inner shaft above a predetermined rotational speed causes the ball bearing to move tangentially relative to the outer perimeter surface from the inner recessed portion of the inner shaft slot to one of the end portions of the inner shaft slot and engage one of the end portions of the outer shaft slot so as to cause the inner shaft to be locked to the outer shaft and rotate therewith.

2. The bi-directional coupler according to claim 1 further comprising a magnet that is magnetically attracted to the ball bearing such that the magnet maintains the ball bearing at or near the inner recessed portion of the inner shaft slot when the inner shaft is stationary or below the predetermined rotational speed.

3. The bi-directional coupler according to claim 2 wherein the magnet is a cylindrical magnet located at a center position of the inner shaft.

4. The bi-directional coupler according to claim 1 wherein the outer shaft slot and the inner shaft slot have a general U-shape.

5. The bi-directional coupler according to claim 4 wherein the inner shaft slot is deeper than the outer shaft slot.

6. The bi-directional coupler according to claim 1 wherein the driving element is an electric motor.

7. The bi-directional coupler according to claim 1 wherein the bi-directional coupler is part of a drive assembly including redundant electric motors and redundant bi-directional couplers.

8. A bi-directional coupler for coupling a driving element to a driven element, said coupler comprising:
   an outer shaft including an outer shaft slot having a curved configuration;
   an inner shaft configured concentric with the outer shaft and including an inner shaft slot elongated in a direction tangential to an outer perimeter surface of the inner shaft and having a curved configuration, said inner and outer shafts being independently rotatable relative to each other;
   a ball bearing provided within the inner shaft slot and configured to ride along the inner shaft slot from a center position to either of two opposing end positions, whereby moving tangentially to one of the end positions causes the ball bearing to protrude radially beyond the outer perimeter surface of the inner shaft; and
   a magnet provided within the inner shaft and being magnetically attracted to the ball bearing and holding the ball bearing in the center position, wherein rotation of the inner shaft above a predetermined rotational speed causes the ball bearing to overcome the magnetic attraction and move from the center position to one of the end positions and engage the outer shaft slot so as to cause the inner shaft to be locked to the outer shaft and rotate therewith.

9. The bi-directional coupler according to claim 8 wherein the magnet is a cylindrical magnet located at a center position of the inner shaft.

10. The bi-directional coupler according to claim 8 wherein the outer shaft slot and the inner shaft slot have a general U-shape.

11. The bi-directional coupler according to claim 10 wherein the inner shaft slot is deeper than the outer shaft slot.

12. The bi-directional coupler according to claim 8 wherein the driving element is an electric motor.

13. The bi-directional coupler according to claim 12 wherein the bi-directional coupler is part of a drive assembly including redundant motors and redundant bi-directional couplers.

14. A drive system comprising:
   a driven element;
   a first motor including a first motor shaft;
   a first bi-directional coupler including a first outer shaft having a first outer shaft slot with a curved configuration, a first inner shaft configured concentric with the first outer shaft and including a first inner shaft slot elongated in a direction tangential to an outer perimeter surface of the first inner shaft and having a curved configuration, said first inner and outer shafts being independently rotatable relative to each other, a first ball bearing provided within the first inner shaft slot and configured to ride along the first inner shaft slot from a center position to either of two opposing end positions, whereby moving tangentially to one of the end positions causes the first ball bearing to protrude radially beyond the outer perimeter surface of the first inner shaft, and a first magnet provided within the first inner shaft and being magnetically attracted to the first ball bearing, wherein the first inner shaft is coupled to the first motor shaft and the first outer shaft is coupled to the driven element;
   a second motor including a second motor shaft; and
   a second bi-directional coupler including a second outer shaft having a second outer shaft slot with a curved configuration, a second inner shaft configured concentric with the second outer shaft and including a second inner shaft slot elongated in a direction tangential to an outer perimeter surface of the second inner shaft and having a curved configuration, said second inner and outer shafts being independently rotatable relative to each other, a second ball bearing provided within the second inner shaft slot and configured to ride along the second inner shaft slot from a center position to either of two opposing end positions, whereby moving tangentially to one of the end positions causes the second ball bearing to protrude radially beyond the outer perimeter surface of the second inner shaft, and a second magnet provided within the second inner shaft and being magnetically attracted to the second ball bearing, wherein the second inner shaft is coupled to the second motor shaft and the second outer shaft is coupled to the driven element, wherein rotation of either or both of the first and second inner shafts in either a clockwise or counter-clockwise direction above a predetermined rotational speed cause the respective first or second ball bearing to overcome the magnetic attraction and move from the center position to one of the end positions and engage the respective first or second outer shaft slot so as to cause the respective first or second inner shaft to be locked to the respective first or second outer shaft and rotate therewith.

15. The system according to claim 14 further comprising a gear assembly coupled between the first outer shaft and the driven element and the second outer shaft and the driven element so that rotation of the first or second outer shaft that is locked to the respective first or second inner shaft cause the other first or second outer shaft to rotate when it is not locked to the other first or second inner shaft.

16. The system according to claim 14 wherein the first and second magnets are cylindrical magnets located at a center position of the first and second inner shafts.

17. The system according to claim 16 wherein the first and second outer shaft slots and the first and second inner shaft slots have a general U-shape.

18. The system according to claim 17 wherein the first and second inner shaft slots are deeper than the first and second outer shaft slots.

19. The system according to claim 14 wherein the first and second motors are electric motors.

* * * * *